US006788855B2

United States Patent
Massey et al.

(10) Patent No.: US 6,788,855 B2
(45) Date of Patent: Sep. 7, 2004

(54) OPTICAL ELEMENT ALIGNMENT DEVICE USING AN ELECTRONIC CAMERA

(75) Inventors: Brian Massey, Marlborough, MA (US); Russel S. Sossong, Shrewsbury, MA (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 11 days.

(21) Appl. No.: 10/171,709

(22) Filed: Jun. 14, 2002

(65) Prior Publication Data

US 2003/0231834 A1 Dec. 18, 2003

(51) Int. Cl.[7] .............................. G02B 6/43; G02B 6/26; G02B 6/30
(52) U.S. Cl. ..................... 385/52; 385/134; 385/147; 385/49
(58) Field of Search ................ 385/52, 95–98, 385/49, 134, 147

(56) References Cited

U.S. PATENT DOCUMENTS

| | | | |
|---|---|---|---|
| 4,875,751 A | * 10/1989 | Ostermeier | ................ 385/119 |
| 5,298,741 A | * 3/1994 | Walt et al. | ............. 250/227.23 |
| 6,081,638 A | 6/2000 | Zhou | |
| 6,181,856 B1 | 1/2001 | Brun | |
| 6,304,694 B1 | 10/2001 | Ford | |
| 6,404,955 B1 | * 6/2002 | Kikuchi et al. | ............... 385/35 |
| 6,625,353 B2 | * 9/2003 | Hananaka | .................... 385/33 |

* cited by examiner

Primary Examiner—Edward J. Glick
Assistant Examiner—Krystyna Suchecki
(74) Attorney, Agent, or Firm—RatnerPrestia

(57) ABSTRACT

An apparatus aligns an optical fiber array, that has first and second ends, to an optical fiber light source at the first end of the optical fiber array by using an image of the second end of the optical fiber array captured by a CCD camera, while the first end of the optical fiber array is moved relative to the optical fiber light source. The apparatus includes a controller, coupled to an alignment stage which moves the first end of the optical fiber array and a variable optical attenuator located between the second end of the optical fiber array and the camera. The controller controls the fiber optic alignment device responsive to signals provided by the electronic camera. The camera is used for rough alignment and an optical power meter, coupled to the alignment stage is used for fine alignment.

21 Claims, 4 Drawing Sheets

US 6,788,855 B2

OPTICAL ELEMENT ALIGNMENT DEVICE USING AN ELECTRONIC CAMERA

BACKGROUND OF THE INVENTION

1. Field of the Invention

The present invention generally relates to a system and method for aligning fiber optic arrays. In particular, the invention relates to a process and system for providing very fast alignment times with improved accuracy of alignment for two-dimensional arrays.

2. Brief Description of the Prior Art

When fiber optic arrays or other optical conduits are used to transmit images over long distances, it may be necessary to use multiple arrays or conduits. Each array traversing its particular finite distance, is a stage of the overall fiber optic transmission system. At the end of one stage and the beginning of another stage, it is desirable to accurately align each fiber in the ending stage with its counterpart fiber or device in the continuing new stage. Failure to accurately align the two arrays may result in loss of power and loss of transmission capability.

Traditionally, vision systems are used with long travel stages to passively align optical fibers. Then, multiple optical power meters with either an InGaAs or Sl detector are used for active alignment using precision motion on multi-axis positioning stages. One problem with this method is that the traditional optical power meter may not be sensitive enough to achieve quick alignment, especially at the early stages of any alignment process. As a result, the traditional optical power meter is not sensitive to lower power transmissions and, consequently, is unable to separate the different channels within the array. In addition, previous systems can not handle extremely high power transmissions, require a longer time to align arrays, and are not scalable for two-dimensional arrays. Thus, array alignment using prior art systems may require the use of multiple power meters.

Consequently, it is desirable to provide a system and process that does not require multiple power meters and that is completely scalable for all two-dimensional optical arrays.

SUMMARY OF THE INVENTION

The present invention is an apparatus for aligning an optical fiber array, that has first and second ends, to an optical fiber source at the first end of the optical fiber array. The apparatus has a fiber optic alignment device, an electronic camera, a variable optical attenuator that is located between the second end of the optical fiber array and the camera, and a controller. The fiber optic alignment device moves the first end of the optical fiber array at a location that is proximate to the optical fiber light source. The electronic camera captures an electronic image from the second end of the optical fiber array. The controller controls the fiber optic alignment device responsive to signals provided by the electronic camera.

DETAILED DESCRIPTION OF THE PREFERRED EMBODIMENTS

The present invention will be understood more fully from the detailed description given below and from the accompanying drawings of preferred embodiments of the invention, which, however, should not be taken to limit the invention to a specific embodiment but are for explanation and understanding only.

Figure 1:
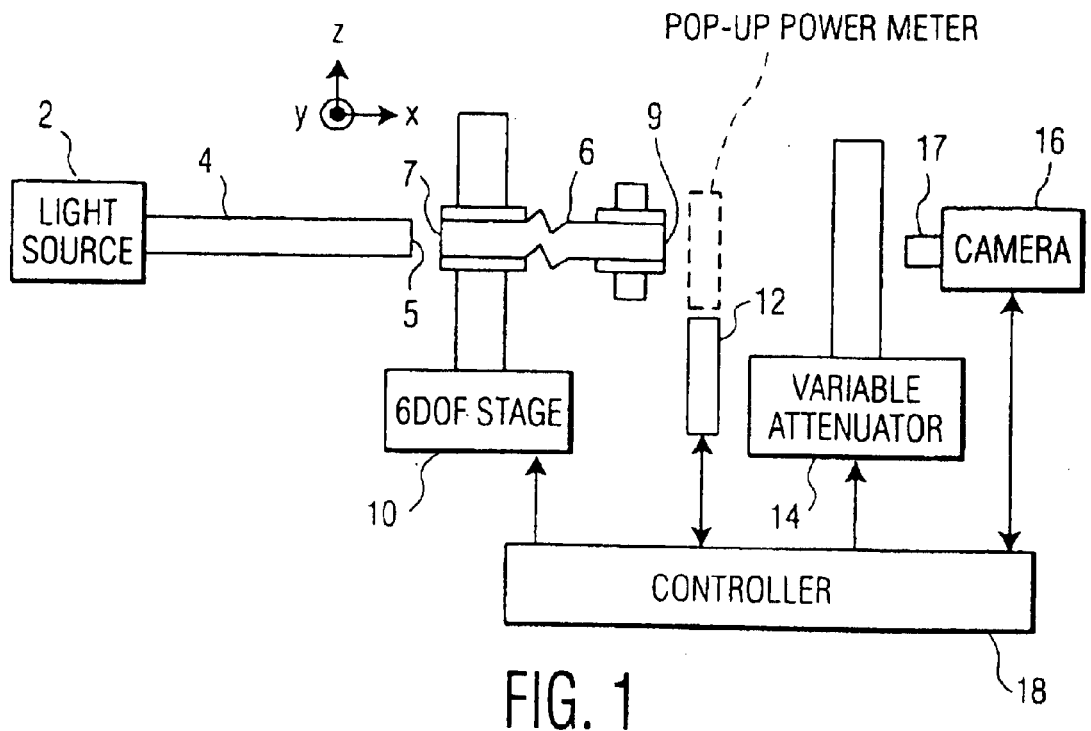
FIG. 1 is a block diagram of a system to align fiber optic arrays or other fiber optic devices.

FIG. 1 is a block diagram of one embodiment of the system. It shows a source of light 2 being directed through a stage of a fiber optic array or other optical device 4. Those skilled in the art will recognize that light source 2 may comprise a plurality of light sources. In one embodiment, fiber optic array 4 consists of an array of 3×12 fibers or 3×12 channels of light. Those skilled in the art will recognize that arrays using other numbers of fibers or channels could also be used. A second fiber optic array or other optical device 6 contains the same number and arrangement as the fibers or channels as optical device 4.

Second optical array 6 is held by an alignment device 10 which can be manipulated in six degrees of freedom (6 DOF). The 6 DOF alignment stage 10 moves the end 7 of the optical array 6 in six directions, the linear axes X, Y, and Z, and the rotational axes U, V, W around axes X, Y, and Z respectively. The X axis defines U axis rotation. The Y axis defines V axis rotation. The Z axis defines W axis rotation. End 5 of optical device 4 is desirably aligned with end 7 of optical array 6. The other end of optical array 6 is designated as end 9.

In one exemplary embodiment of the invention, variable attenuator 14 is a device holding a number of neutral density filters of varying densities. The number of filters may range from one to eight or more. The exemplary filters are arranged sequentially from the lowest density to the highest density. In one embodiment, they have transmissibility ranging from 1.0 to 7.6. In one exemplary embodiment, the neutral density filter employs eight filter elements having values of 1, 3, 4.5, 6, 6.5, 7, 7.3 and 7.6. Although the exemplary embodiment of the invention is described as using neutral diversity filters for the variable attenuator 14, it is contemplated that other methods may be used to achieve optical attenuation such as varying the power of the light signal provided by the light source 2 or by using an electronic shutter on the camera 16 to reduce the integration time of the image array of the camera 16.

A pop-up power meter 12, such as, in one embodiment, a Newport 818-SL, is located between the other end 9 of optical array 6 and the variable attenuator 14. Those skilled in the art, however, will recognize that power meter 12 may be placed between variable attenuator 14 and camera 16. In an exemplary embodiment of the invention, camera 16 is a charge coupled device (CCD) camera. Any of a number of CCD or CMOS photodiode video imaging arrays may be used with suitable camera optics 17, as described below, to form the camera 16. Variable attenuator 14 is placed between end 9 of the second optical array 6 and the lens of camera 16. Camera 16 is fitted with camera optics 17 having a large diameter optical lens because it allows for more light to enter the optical system and therefore increases the sensitivity of the camera even when there are relatively large gaps and/or misalignments between the optical components 4 and 6. In the exemplary embodiment of the invention, the camera optics 17, may be, for example, the Optem Zoom 70 lens system.

Figure 2:
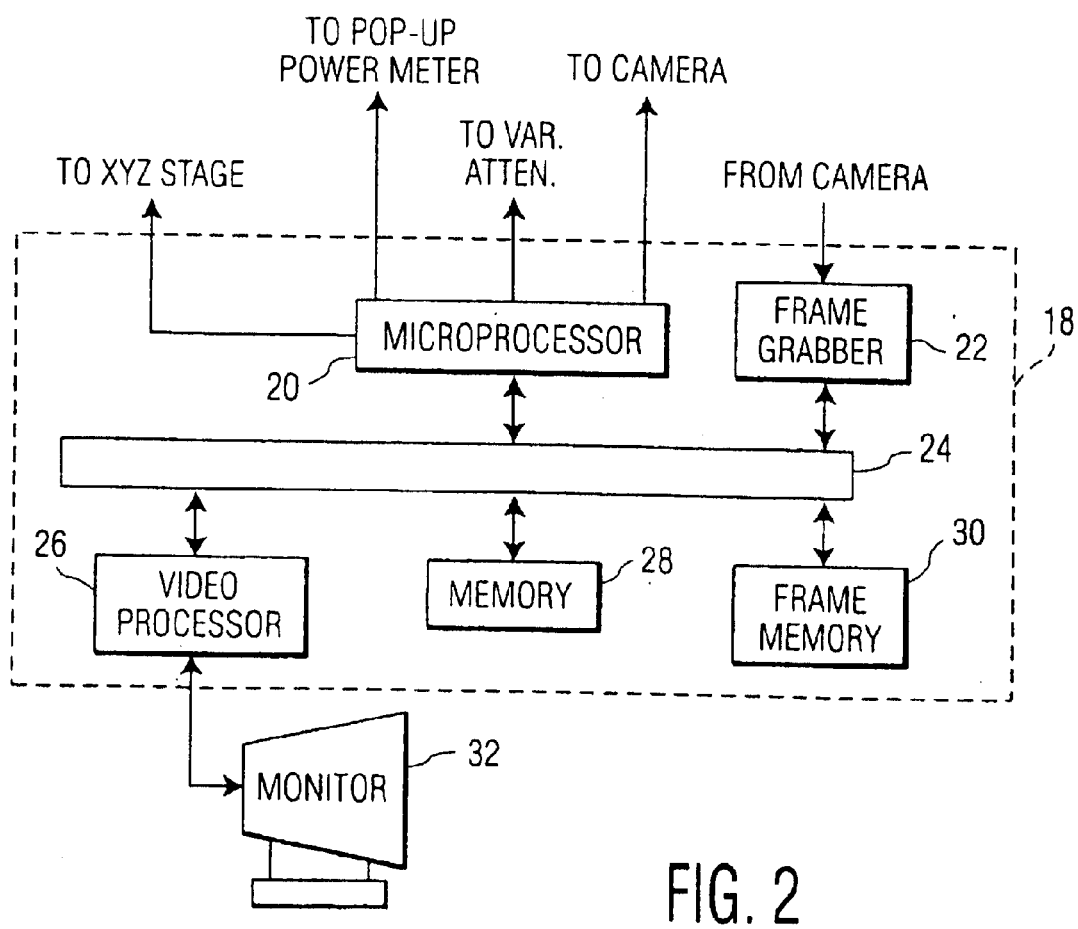
FIG. 2 is a block diagram of an exemplary controller system that allows the alignment device in FIG. 1 to be completely scalable for all two-dimensional optical arrays.
Figure 3:
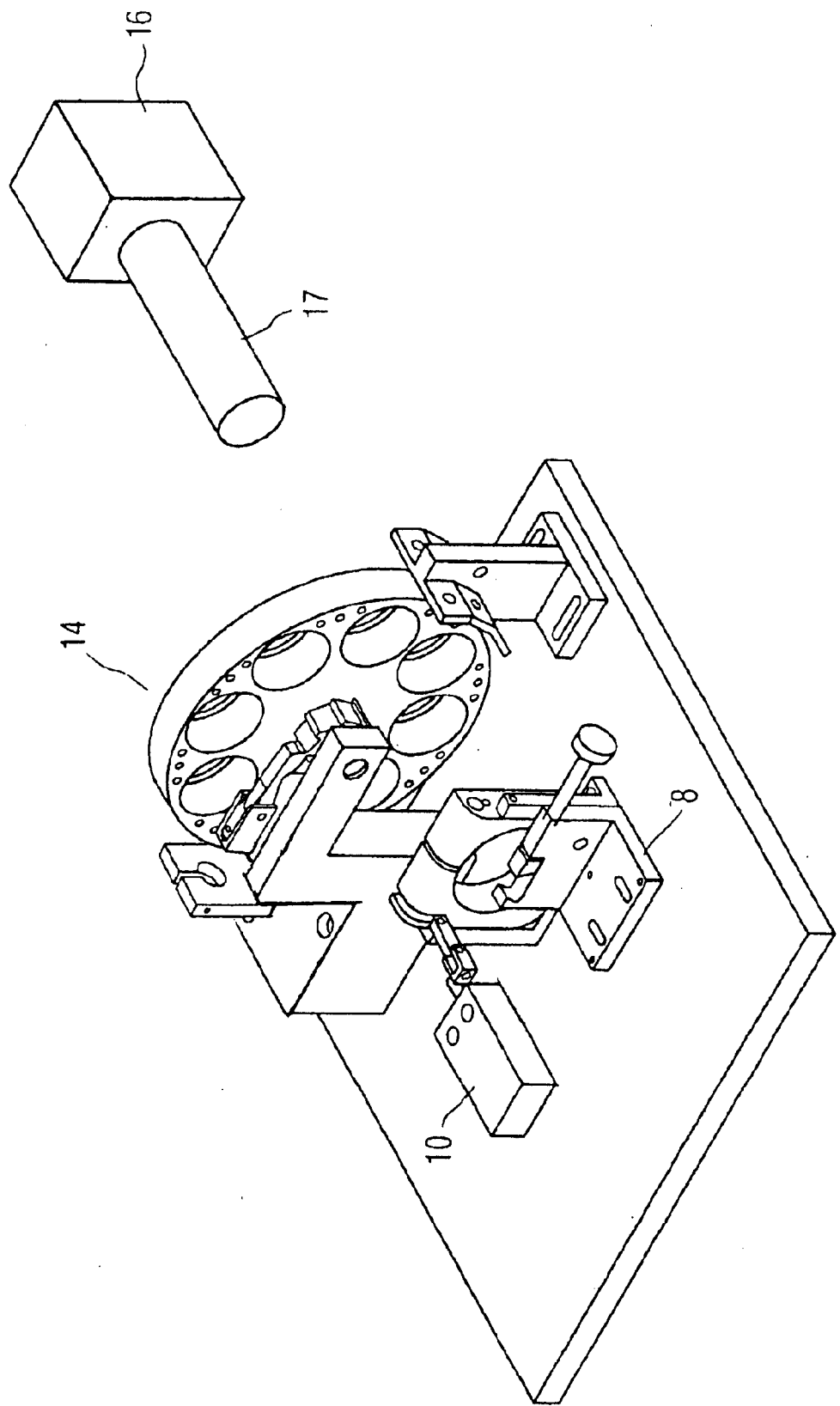
FIG. 3 is a perspective diagram of the main features of the apparatus described in connection with FIGS. 1 and 2.

FIG. 2 is a block diagram of the elements comprising controller 18. Controller 18 includes a microprocessor 20 which is connected to power meter 12, camera 16, variable attenuator 14, and 6 DOF alignment stage 10. Microprocessor 20 causes camera 16 to provide images of the light provided by optical array 6 through variable attenuator 14. Microprocessor 20 also causes variable attenuator 14 to change filters, causes the 6 DOF alignment stage 10 to manipulate optical array 6 so as to better align it with optical array 4, and works with pop-up power meter 12 and 6 DOF alignment stage 10 to make power measurements during the final alignment process, as described below.

As camera 16 receives light signals, it converts the light signals to electronic signals representing a two-dimensional image of the end of fiber optical array 6 and transmits the electronic signals to a frame grabber 22. With a particular filter being inserted in the light path between optical array 6 and camera 16 by variable attenuator 14, frame grabber 22 captures one frame of the video stream coming from camera 16 and, via bus 24, sends the electronically saved frame to frame memory 30. The saved frame is then accessed via bus 24 by video processor 26. Video processor 26 formats the frame for display on monitor 32 and using, for example, 8-bit pixel values defining a gray scale range of from 0 to 255, microprocessor 20 measures the light in regions of interest in the pixel array in order to obtain a total measurement for the pixel or channel array. An exemplary region of interest includes more than 20 pixels and may be, for example, in one embodiment, an area of 40 by 40 pixels provided by the camera 16. Alternatively, the region of interest may be 50×50, or a region of any other size, as long as it includes a sufficient number of pixels to provide a statistically significant measure of the illumination of the region of interest.

The exemplary images may include one region of interest for each fiber in the optical array 6. The regions of interest may be defined by capturing and displaying an image of the end 9 of the optical array 6. A user may then indicate multiple regions of interest on the displayed optical image, using, for example, a touch screen interface, light pen or other device to generate input signals for the micropressor 20. Alternatively, the microprocessor may automatically determine the regions of interest, for example, by examining the captured image for bright spots when the optical array 6 is illuminated directly by the light source 2.

To determine the amount of power in each region of interest, the exemplary embodiment of the invention sums all of the pixel values in the region of interest that have a value greater than a predetermined value representing a noise level. In the exemplary embodiment in which pixels may have values between 0 and 255, a noise value of 40 has been found to produce good results.

Figure 4:
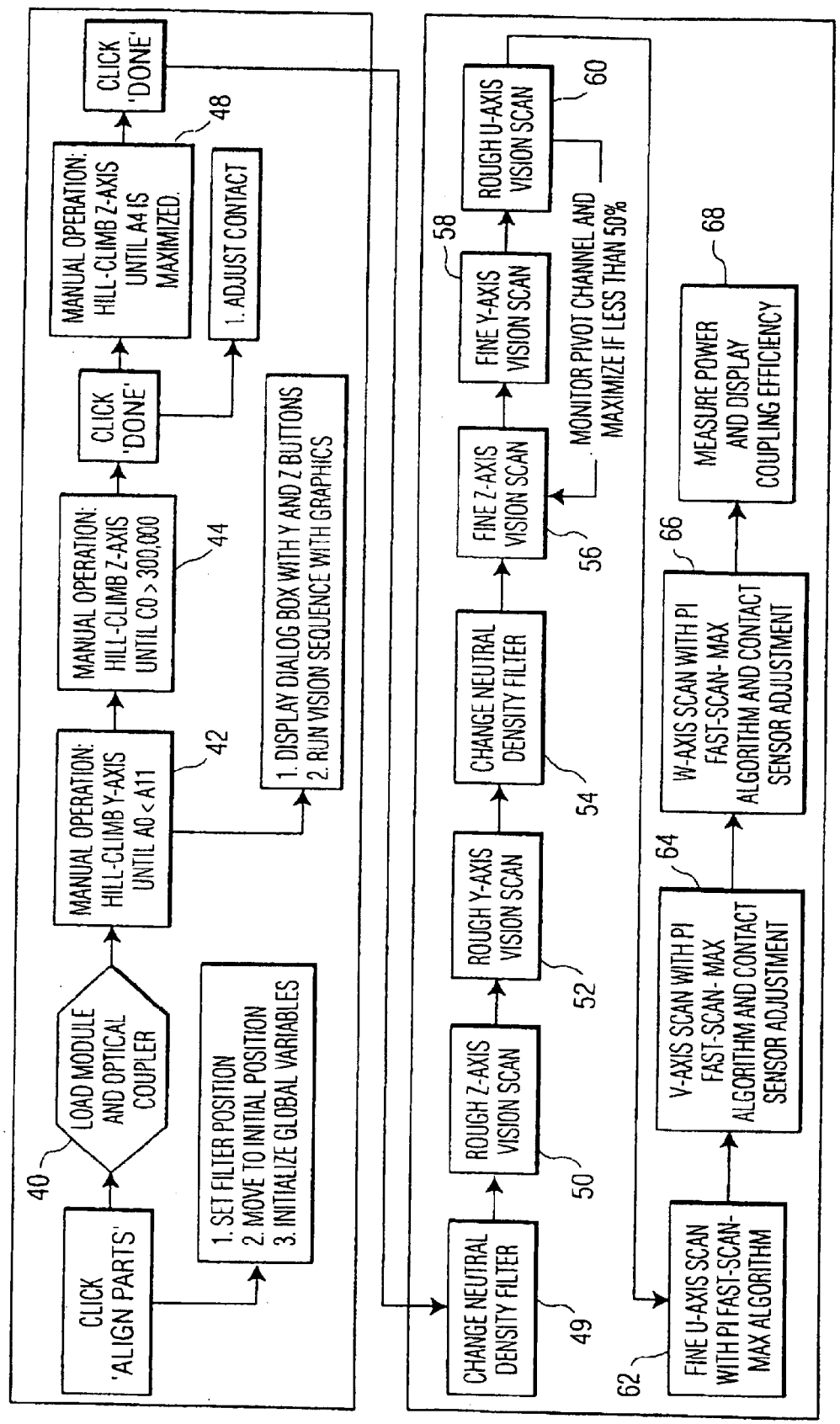
FIG. 4 is a flow chart showing the process of using the system described in connection with FIGS. 1 to 3.

The process of the invention may be understood by reference to FIG. 4, which is a flow-chart diagram of the steps taken to align optical arrays 4 and 6. First, when the lowest value neutral density filter is inserted by variable attenuator 14, step 40 shows that ends 5 and 7 of optical arrays 4 and 6 are manually placed in approximate alignment and the ends 5 and 7 are aligned using the 6 DOF alignment stage 10, as described below with reference to FIG. 4.

Prior to step 40, the variable attenuator 14 places the neutral density filter with the lowest density (i.e. which passes the most light) between the 6 DOF alignment stage 10 and camera 16 in order to enable camera 16 to find a series of "first lights." The lowest density filter is used because there is likely to be a relatively large gap between the related pixels or channels of ends 5 and 7 of optical arrays 4 and 6 and because the ends 5 and 7 are likely to be poorly aligned resulting in little light being coupled from component 4 to optical array 6. The large gap allows light to be coupled from optical array 4 to optical array 6 over a wider alignment range but with less power than if the fiber ends 5 and 7 were close together.

Figure 5:
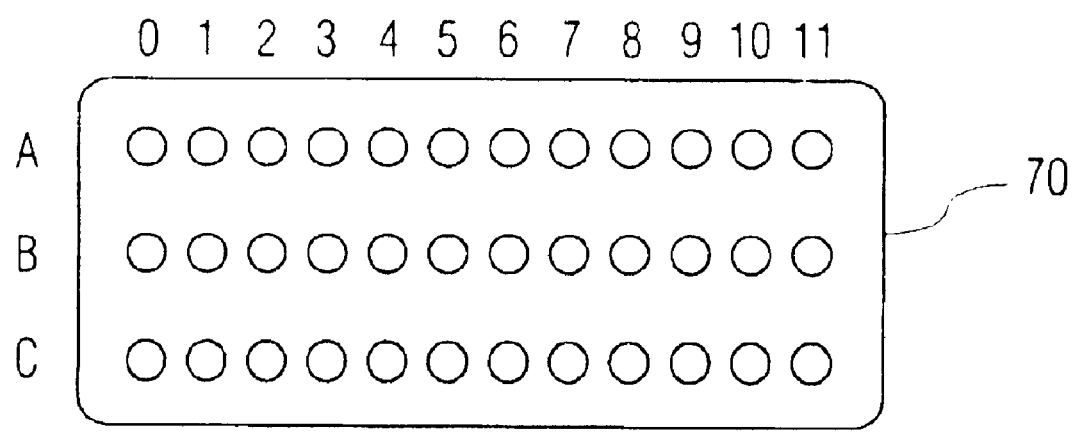
FIG. 5 depicts an embodiment of a three by twelve pixel array with pixel designations.

FIG. 5 depicts an embodiment of a twelve pixel array 70 of optical arrays 4 and 6, in the YZ plane, using exemplary designations for each pixel. Those skilled in the art will recognize that different designations could be used. Those skilled in the art will also recognize that other embodiments may use arrays consisting of a different number of rows or a different number of pixels in each row. The exemplary embodiment shows three rows of pixels designated as rows A, B, and C. Each row contains twelve pixels, the first pixel in each row being designated 0, the second pixel being designated 1 and so on until the twelfth pixel which is designated 11. Each pixel is therefore designated by reference to two identifiers: a letter identifier and a numeric identifier. For example, the pixel in the uppermost left hand corner of FIG. 5 is referred to as A0, the pixel under it is referred to as B0 and the pixel in the lowermost left hand corner is referred to as C0. Similarly, the pixel in the fifth position of row A is referred to as A4. The reference identifications of all of the other pixels in FIG. 5 will now be apparent to those skilled in the art.

As shown at step 42, the optical array 6 is manually moved in the Y direction in order to get a first light on the A row of outer pixels or channels. Then, at step 44, the optical array 6 is manually moved in the Z direction in order to maximize the light transmitted through the first pixel or channel in the C row. After this step, the distance between the end 5 and the end 7 is adjusted so that the gap between them is approximately 10 to 30 microns. This gap reduces the power transmitted by the optical array 6 to a level that can be handled by camera 16.

Next, as shown in step 48, the optical array 6 is again manually moved in the Z direction until the light coming through the fifth pixel in row A is maximized. This pixel selection is exemplary, it is contemplated that any pixel away from the sides of the optical array 6 in any row may be used instead. Next, as shown in step 49, the variable attentuator 14 inserts a higher density neutral density filter. After a higher density neutral density filter is inserted between end 9 and camera 16, an automatic vision scan is used beginning at step 50. Microprocessor 20 steps the array through several fine steps in the Z direction and camera 16 measures the power along the Z axis, taking measurements at Z0, Z1, Z2, etc. until the different power levels from all of the steps along the Z axis have been measured. The measurements are stored in memory 28. After all of the Z axis measurements have been made, the microprocessor 20 examines the stored entries and moves the array along the Z axis to the point of maximum power. Then, as shown in step 52, again under the control of microprocessor 20, camera 16 measures the power from the optical array 6 as the optical array 6 is moved in small, discrete steps along the Y axis. Again, under the control of microprocessor 20, camera 16 measures the power along the Y axis, taking measurements at Y0, Y1, Y2, etc. until the different power levels from all of the steps along the Y axis have been measured and the measurements have been stored in memory 28. After all of the Y axis measurements have been made, the microprocessor moves the array along the Y axis to the point of maximum power.

The step size used in steps 50 and 52 of the process shown in FIG. 4 depends on the size of the optical fibers in the array and on the method used to identify the maximum value. In the exemplary embodiment of the invention, the step size is a small fraction of the diameter of the fiber (e.g. $<\frac{1}{10}^{th}$) and a curve-fitting method is used to locate the position at which maximum light is transmitted. This method allows a location between two measured points to be selected as the maximum transmission point. Alternatively, the method may simply select the position that exhibits the greatest power level as the maximum.

As shown in step 54, when the power has been maximized in steps 50 and 52, microprocessor 20 causes the variable attenuator 14 to insert a higher density neutral density filter between end 9 and camera 16 and the process is repeated under the control of the microprocessor 20. That is, the array is moved along the Z axis as shown in step 56 in order to locate the point of maximum light transmission and then the array is moved along the Y axis as shown in step 58 in order again to locate the point of maximum light transmission. The process is repeated until all of the filters in variable attenuator 14 have been inserted between optical array 6 and camera 16 and maximum power has been attained with the highest density filter in both the Z and Y directions.

After the maximum power has been attained in step 58 of the process, microprocessor 20 causes a rough U axis rotation around the X axis in order to maximize the light as shown in step 60.

For the next stage of the process, camera 16 is removed from the process and power meter 12 is used instead. Also, control of further power measurements and control of further fine movements along the U, V, and W rotational axes is accomplished by using a Politec PI Fast-Scan-Max Algorithm that is loaded onto the 6 DOF alignment stage 10. Beginning with the part of the process designated as step 62, 6 DOF alignment stage 10 controls the operation of the system, in that it conducts the final alignments of the optical devices under control of the PI Fast-Scan-Max Algorithm and reports back to microprocessor 20 at the end of each stage of the final alignments.

Accordingly, microprocessor 20 instructs 6 DOF alignment stage 10 to conduct a fine U axis scan with the PI Fast-Scan-Max Algorithm as shown in step 62. Under the control of the algorithm, 6 DOF alignment stage 10 performs a fast scan of the power at the regions of interest at 0 degrees. That is, at 0 degrees, the optical array 6 is moved along the Z axis at step 56 and measurements are taken; then, reverting to 0 degrees, the array is moved along the Y axis at step 58 and measurements are taken. After step 58, the optical array 6 is rotated in the U axis to ½ degree, at step 60 and additional fast scans along the Y and Z axes are performed at steps 56 and 58. After these scans are performed, the optical array 6 is rotated in the U axis to ½ degree and similar fast scans are performed. Then, the optical array 6 is rotated varying amounts in the opposite direction to the other side of 0 degrees, fast scans are performed, and measurements of power are stored. After the process indicated by step 62 is completed, the process is repeated for the V axis and for the W axis as shown in steps 64 and 66. In each stage, the power is being measured by power meter 12 and information from power meter 12 is fed back to 6 DOF alignment stage 10 through microprocessor 20.

Before the alignment process was started, power meter 12 measured the light from fiber optic array 4 without the intervention optical array 6. After the entire alignment process has been completed, the optical array 6 is placed at the location of maximum power and the power meter 12 makes a final power measurement, compares it with a power measurement from the optic array 4 made at the beginning of the process, and displays the coupling efficiency by comparing the two readings as a fraction with the new reading being the numerator and old reading being the denominator.

What is claimed:

1. Apparatus for aligning an optical fiber array, having first and second ends, to an optical fiber light source at the first end of the optical filter array, the apparatus comprising:
   a fiber optic alignment device operable to move the first end of the optical fiber array at a location proximate to the optical fiber light source;
   an electronic camera operable to capture an electronic image from the second end of the optical fiber array;
   a variable optical attenuator located between the second end of the optical fiber array and said camera; and
   a controller which controls the fiber optic alignment device responsive to signals provided by the electronic camera.

2. The apparatus of claim 1, further comprising a display device for displaying the image of the optical fiber array captured by the camera.

3. The apparatus of claim 2, wherein:
   the optical fiber array comprises a plurality of optical fibers;
   the displayed image of the optical fiber array includes an image of selected optical fibers of the plurality of optical fibers;
   the image of each selected optical fiber consists of a plurality of pixels; and
   each plurality of pixels comprises at least one region of interest.

4. The device of claim 3, wherein the at least one region of interest includes more than 20 pixels.

5. The apparatus of claim 3, wherein the controller is operable to measure the power in the at least one region of interest and is operable to control the alignment of the optical fiber array to the optical fiber light source in response to the measured power.

6. The device of claim 5, wherein the camera is operable to provide a rough alignment between the optical fiber array and the optical fiber light source when the light source and the optical fiber array are separated by a space that is in excess of 30 microns in the alignment.

7. The device of claim 5, further comprising an optical power measuring device between the optical fiber array and the camera; said optical power measuring device being operable to provide a fine alignment between the optical fiber array and the optical fiber light source when the light source and the optical fiber array are separated by a space that is less than 30 microns.

8. Apparatus for aligning an optical fiber array, having first and second ends and having a plurality of optical fibers, with an optical fiber light source having a respective plurality of light sources, said apparatus comprising:
   a fiber optic alignment device being configured to move the first end of the optical fiber array relative to the optical fiber light source in at least first and second directions in a plane parallel to the first end of the fiber optic array;
   an electronic camera operable to capture an electronic image from the second end of the fiber optic array;

a variable optical attenuator located between the second end of the fiber optic array and said camera;

a controller which controls the fiber optic alignment device and the variable optical attenuator responsive to signals provided by the electronic camera whereby the alignment device moves the array to increase the amount of light in the image provided to the camera as attenuation provided by the variable optical attenuator is increased.

9. The apparatus of claim 8, wherein the controller is operable to move the fiber optic alignment device in said first and second directions and in a third direction in a plane perpendicular to the plane defined by the first and second directions.

10. The apparatus of claim 9, wherein the fiber optic alignment device is capable of moving in at least fourth, fifth, and sixth directions;

said fourth direction being a rotation about an axis parallel to the first direction;

said fifth direction being a rotation about an axis parallel to the second direction;

said sixth direction being a rotation about the axis parallel to the third direction;

and further including an optical power measuring device located between the fiber optic array and the camera;

said controller being operable to control the fiber optic alignment device in at least one of the fourth, fifth, and sixth directions responsive to signals provided by optical power measuring device whereby the fiber optic alignment device moves the fiber optic array to increase the measure of optical power provided by the optical power measuring device.

11. The apparatus of claim 10, wherein the optical power measuring device is operable with the fiber optic alignment device to perform a fine alignment in at least one of said fourth, fifth and sixth directions.

12. The apparatus of claim 8, wherein the electronic camera captures an image by integrating light and the variable optical attenuator comprises an electronic shutter coupled to the electronic camera for controlling an amount of time during which the electronic camera integrates light.

13. The apparatus of claim 8, wherein the camera is operable with the controller and the fiber optic alignment device to perform a rough alignment in at least one of said first and second directions.

14. A method for using an electronic camera and signal provided thereby to align an optical fiber array, having first and second ends, to an optical fiber light source at the first end of the optical fiber array configured to provide light, through the optical fiber array, at the second end of the optical fiber array, the method comprising the steps of:

moving the first end of the optical fiber array with a fiber optic alignment device relative to the optical fiber light source at a location proximate to the optical fiber light source;

attenuating the light provided by the optical fiber;

capturing, by the electronic camera, an electronic image of the second end of the optical fiber array, the electronic image including images of each optical fiber in the optical fiber array; and controlling the movement of the first end of the optical fiber array, by the fiber optic alignment device, responsive to signals from the electronic camera.

15. The method of claim 14, further comprising the step of displaying the image of the optical fiber array captured by the camera to define at least one region of interest corresponding to at least one of the optical fibers in the optical fiber array.

16. The method of claim 15, wherein the light provided by the optical fiber array has an optical power and the step of controlling the fiber optic alignment device includes the steps of:

measuring the optical power of the light provided by the optical fiber in the at least one region of interest; and controlling the alignment in response to the measured power.

17. A method for aligning an optical fiber array, having first and second ends and having a plurality of optical fibers, with an optical fiber light source that is configured at the first end of the optical fiber array to provide light through the optical fiber at the second end of the optical fiber array, the optical fiber light source having a respective plurality of light sources, said method comprising the steps of:

moving the first end of the fiber optic array relative to the optical fiber light source with a fiber optic alignment device in at least first and second directions in a plane parallel to the first end of the fiber optic array;

capturing an electronic image in an electronic camera of the second end of the fiber optic array, the electronic camera providing signals representing the electronic image;

adjusting a variable optical attenuator between the second end of the fiber optic array and the camera to attenuate light provided by the second end of the optical fiber array; and controlling the fiber optic alignment device and the variable optical attenuator responsive to signals from the electronic camera, including the step of moving the optical fiber array with the fiber optic alignment device to increase a measure of an amount of light in the image from the electronic camera as attenuation provided by the variable optical attenuator is increased.

18. The method of step 17, including the step of moving the optical fiber array in a third direction in a plane perpendicular to the plane defined by the first and second directions.

19. The method of claim 18, including the step of moving the optical fiber array in at least fourth, fifth, and sixth directions; said fourth direction being a rotation about the axis of the first direction; said fifth direction being a rotation about the axis of the second direction; and said sixth direction being a rotation about the axis of the third direction.

20. The method of claim 19, including the step of providing a space between the optical fiber array and the optical fiber light source in excess of 30 microns while the optical fiber array is moved in the first and second directions.

21. The method of claim 20, including controlling the fiber optic alignment device to move the optical fiber array in the third direction to provide a space between the optical fiber array and the optical fiber light source that is less than 30 microns while the optical fiber is moved in the fourth, fifth and sixth directions.

* * * * *